(12) United States Patent
Tramoni et al.

(10) Patent No.: US 12,164,316 B2
(45) Date of Patent: Dec. 10, 2024

(54) NFC MODULE POWERING

(71) Applicants: STMicroelectronics (Rousset) SAS, Rousset (FR); STMicroelectronics France, Montrouge (FR); STMicroelectronics (Alps) SAS, Grenoble (FR)

(72) Inventors: Alexandre Tramoni, Le Beausset (FR); Florent Sibille, Grenoble (FR); Patrick Arnould, Voreppe (FR)

(73) Assignees: STMicroelectronics (Rousset) SAS, Rousset (FR); STMicroelectronics France, Montrouge (FR); STMicroelectronics (Alps) SAS, Grenoble (FR)

( * ) Notice: Subject to any disclaimer, the term of this patent is extended or adjusted under 35 U.S.C. 154(b) by 0 days.

(21) Appl. No.: 18/119,535

(22) Filed: Mar. 9, 2023

(65) Prior Publication Data

US 2023/0297126 A1    Sep. 21, 2023

(30) Foreign Application Priority Data

Mar. 16, 2022 (FR) ...................................... 2202283

(51) Int. Cl.
*H04B 5/79* (2024.01)
*G05F 1/46* (2006.01)

(52) U.S. Cl.
CPC ................. *G05F 1/46* (2013.01); *H04B 5/79* (2024.01)

(58) Field of Classification Search
USPC .......... 327/538, 540–543, 530; 323/324–298
See application file for complete search history.

(56) References Cited

U.S. PATENT DOCUMENTS

| | | | | |
|---|---|---|---|---|
| 7,427,582 | B2* | 9/2008 | Ballard | C09K 8/536 507/119 |
| 7,948,421 | B2* | 5/2011 | McCoy | H03M 1/60 341/155 |
| 9,698,872 | B2* | 7/2017 | Haverinen | H04B 5/26 |
| 10,680,677 | B2* | 6/2020 | Wobak | H04B 5/45 |
| 11,797,814 | B2* | 10/2023 | Li | G06K 19/0709 |
| 2013/0015828 | A1* | 1/2013 | Amir | G05F 1/56 323/273 |
| 2013/0295843 | A1 | 11/2013 | Tian et al. | |
| 2021/0099162 | A1 | 4/2021 | Tramoni et al. | |

FOREIGN PATENT DOCUMENTS

GB      2547447 A      8/2017

OTHER PUBLICATIONS

INPI Search Report and Written Opinion for priority application, FR 2202283, report dated Nov. 17, 2022, 10 pgs.

* cited by examiner

*Primary Examiner* — Thomas J. Hiltunen
(74) *Attorney, Agent, or Firm* — Crowe & Dunlevy LLC (57) ABSTRACT

An electronic device includes a near-field communication module and a powering circuit for delivering a power supply voltage to the near-field communication module. When the near-field communication module is in a low power mode, the powering circuit is configured for an operational mode where it is periodically started to provide the power supply voltage.

16 Claims, 4 Drawing Sheets

NFC MODULE POWERING

PRIORITY CLAIM

This application claims the priority benefit of French Application for Patent No. 2202283, filed on Mar. 16, 2022, the content of which is hereby incorporated by reference in its entirety to the maximum extent allowable by law.

TECHNICAL FIELD

The present disclosure generally relates to the power supply of an electronic device and, more particularly, a near-field communication (NFC) module comprised in an electronic device. The present disclosure more particularly relates to different modes of power supply of a near-field communication module comprised in an electronic device.

BACKGROUND

Currently, the power consumption of electric devices is a significant issue in the industry. Decreasing the power consumption of a device while ensuring its proper operation and its performance is one of the main objects of research and development.

It would be desirable to at least partly improve certain aspects of the power supply of an electronic device which includes a near-field communication module.

There is a need for electronic devices consuming less power.

There is a need for near-field communication modules consuming less power.

There is a need to overcome all or part of the disadvantages of known electronic devices.

SUMMARY

An embodiment addressing all or part of the disadvantages of known near-field communication modules is provided by an electronic device comprising: a near-field communication module; and a powering circuit for said module, wherein, when said near-field communication module is in a low power mode, said powering circuit is configured to be periodically started.

Another embodiment provides a method of powering in a low power mode a near-field communication module of an electronic device further comprising a powering circuit for said module, wherein, when said near-field communication module is in a low power mode, said powering circuit is configured to be periodically started.

According to an embodiment, in the low power mode of said near-field communication module, said powering circuit is controlled by a control circuit adapted to periodically starting said powering circuit.

According to an embodiment, the control circuit comprises a counter.

According to an embodiment, in the low power mode of said near-field communication module, the counter is started and when the value of the counter reaches a threshold value, then the powering circuit is started.

According to an embodiment, in the low power mode of said near-field communication module, when the value of the counter reaches a limiting value, greater than the threshold value, then the powering circuit is stopped and the value of the counter is reset to zero.

According to an embodiment, said near-field communication module comprises a field detector.

According to an embodiment, in the low power mode of said near-field communication module, when the powering circuit is started, said near-field communication module is powered and its field detector is started.

According to an embodiment, said near-field communication module further comprises a circuit configured to compare the frequency of an electric field detected by said field detector with a reference frequency.

According to an embodiment, said frequency comparator circuit is a state machine.

According to an embodiment, during the low power mode, when said circuit concludes that the frequency of the field detected by said field detector is equal to the reference frequency, with an error margin in the order of 10%, then an alert signal is generated.

According to an embodiment, said device further comprises a circuit for powering a processor adapted to receiving said alert signal.

According to an embodiment, said circuit for powering comprises a voltage regulator adapted to regulating an internal power supply voltage and to delivering a voltage for powering said near-field communication module.

According to an embodiment, said circuit for powering further comprises a circuit of a reference voltage delivered by a band gap.

According to an embodiment, said control circuit further comprises a circuit of a reference voltage delivered by a band gap.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, no near-field communication protocol is described herein, near-field communication protocols are compatible with the embodiments described hereafter.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
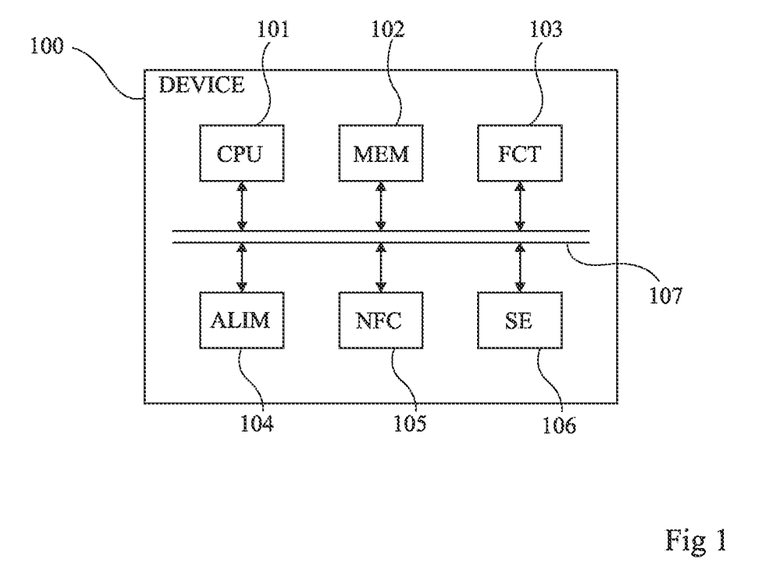
FIG. 1 very schematically shows in the form of blocks an electronic device to which the embodiments described in relation with FIGS. 3 to 5 may be applied.

FIG. 1 very schematically shows in the form of blocks an example of an electronic device 100 (DEVICE) to which the embodiments described in relation with FIGS. 3, 4 and 5A-5B may be applied.

Device 100 is an electronic device, such as a cell phone or a connected device, having its power supply delivered at least partially internally. Thus, device 100 comprises: a processor 101 (CPU); one or a plurality of memories 102 (MEM); one or a plurality of circuits 103 (FCT) implementing different functionalities of device 100; powering circuits 104 (ALIM); a near-field communication module 105 (NFC) or NFC module 105; optionally, a secure element 106 (SE); and one or a plurality of computer buses 107 enabling the different circuits and components to exchange data and/or power.

Processor 101 may be the main processor in charge of implementing, for example, the basic functionalities and/or the complex functionalities of device 100. Device 100 may, for example, comprise other processors such as secondary processors linked to specific tasks.

Memory or memories 102 are data storage units of device 100. Memories 102 may be of different types, such as RAMs, volatile memories, non-volatile memories, ROMs, etc.

Circuits 103 may comprise one or a plurality of data measurement or processing circuits, one or a plurality of display devices, etc.

Powering circuits 104 are circuits used for the power supply of device 100 and of each of its circuits and components. Powering circuits 104 may comprise powering circuits dedicated to specific circuits or components of device 100. According to an example, the powering circuits comprise at least one circuit for powering NFC module 105. Powering circuits 104 may further comprise an internal power source such as a battery or a voltage source. Powering circuits 104 may further comprise circuitry configured to adapt the power originating from an external source, for example, from the mains.

NFC module 105 is a near-field communication (NFC) module using a short-range and high-frequency wireless communication technology, allowing data exchange between peripherals all the way to a distance of approximately 10 cm.

Secure element 106 is a reliable electronic device enabling to process critical or secret data. Secure element 106 may be used to perform data ciphering and/or deciphering, operations on critical data, and/or to store critical data. Secure element 106 is optional.

In FIG. 1, a single bus 107 is shown and couples all the circuits and components of device 100 to one another, but a plurality of buses 107 coupling certain circuits and components to one another may be envisaged.

Figure 2A:
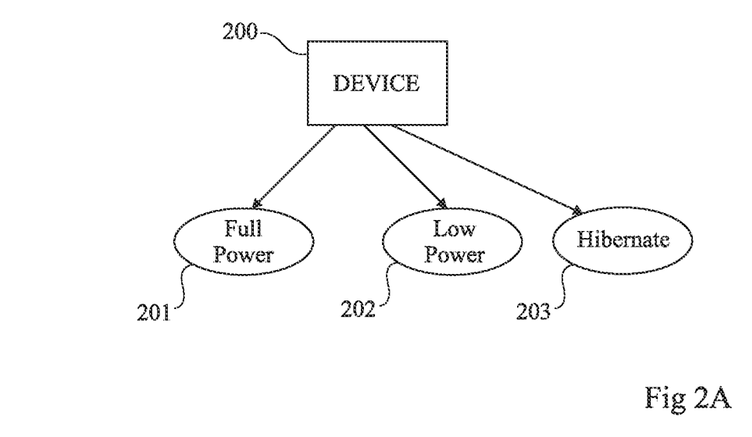
FIGS. 2A-2B very schematically show, in the form of blocks, two block diagrams illustrating different modes of power supply of an electronic device and of a near-field communication module.
Figure 2B:
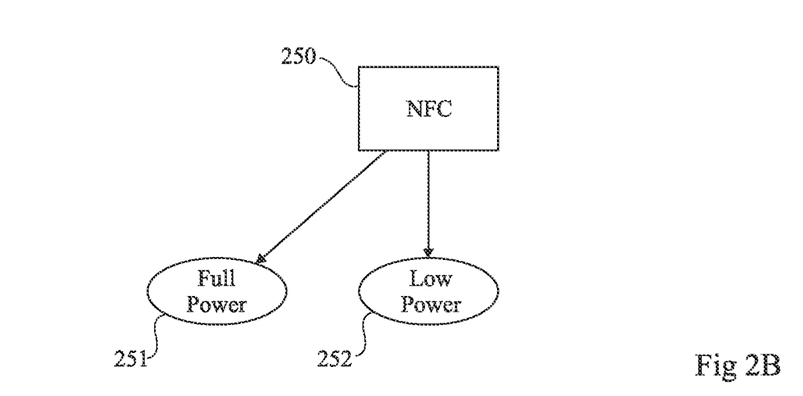

FIGS. 2A-2B are diagrams illustrating examples of different possible electronic device powering modes. FIG. 2A illustrates examples of different possible modes of power supply of an electronic device 200 (DEVICE) of the type of the device 100 described in relation with FIG. 1. FIG. 2B illustrates examples of different modes of power supply of a near-field communication module 250 (NFC), or NFC module 250, of the type of the NFC module 105 described in relation with FIG. 1, forming part of device 200.

The electronic device 200 as shown in the diagram of FIG. 2A, for example, comprises at least three different power supply modes during which electronic device 200 consumes more or less power and/or may implement more or fewer functionalities. Electronic device 200 may comprise other variants of power supply modes than the power supply modes described hereafter. The power supply modes are the following: the "full power" mode 201; the "low power" mode 202; and the "hibernate" mode 203.

The "full power" mode 201 is the power supply mode where electronic device 200 is likely to consume the most power. All of its functionalities may be used.

The "low consumption" mode, or "low power" mode 202 is a power supply mode where electronic device 200 decreases its power consumption. For this purpose, electronic device 200 may prevent the implementation of certain functionalities, and/or intentionally cause a slowing down of the implementation of some of or of all its functionalities, for example, by slowing down the operation of its processor(s).

The "hibernate" mode, or standby mode, 203, is a power supply mode where electronic device 200 drastically decreases its power consumption by only authorizing certain very specific functionalities. More particularly, in this power supply mode, most functionalities of device 200 are disabled and only the functionalities enabling to "wake up" device 200 are enabled. One calls herein functionalities enabling to "wake up" device 200 functionalities adapted to having device 200 switch from the "hibernate" mode to another power supply mode, the "full power" mode or the "low power mode" for example. These functionalities are, for example, the possibility of leaving this mode by pressing a button of device 200, the detection of a communication request, for example, a near-field communication request or a telephone call request if device 200 is a telephone. Thus, NFC module 250 generally forms part of the circuits of a device 200 powered during a hibernate mode.

The NFC module 250 shown in the diagram of FIG. 2B, for example, comprises at least two different power supply modes during which NFC module 250 consumes more or less power and/or may implement more or fewer functionalities. NFC module 250 may comprise other power supply modes than the power supply modes described hereafter. The power supply modes are the following: the "full power" mode 251; and the "low power" mode 252.

The "full power" mode 251 is the power supply mode where NFC module 250 is likely to consume the most power. During this mode, NFC module 250 may, for example, detect the presence of a field periodically at a frequency in the order of 1 kHz, or even may continuously detect the presence of a field.

The "low consumption" mode, or "low power" mode, 252, is a power supply mode where NFC module 250 decreases its power consumption. For this purpose, NFC module 250 may, for example, slow its field detection frequency down to a frequency in the order of 500 Hz. FIGS. 3, 4 and 5A-5B show embodiments of a circuit for powering the NFC module, and more particularly their implementation during a "lower power" mode.

The different modes of power supply of device 200 and of NFC module 250 are independent from one another. Device 200 may be in the hibernate mode and NFC module 250 may be in the full power mode, for example. According to another example, if the user of device 200 decides not to use the NFC module, it may set it to a "low power" mode.

Figure 3:
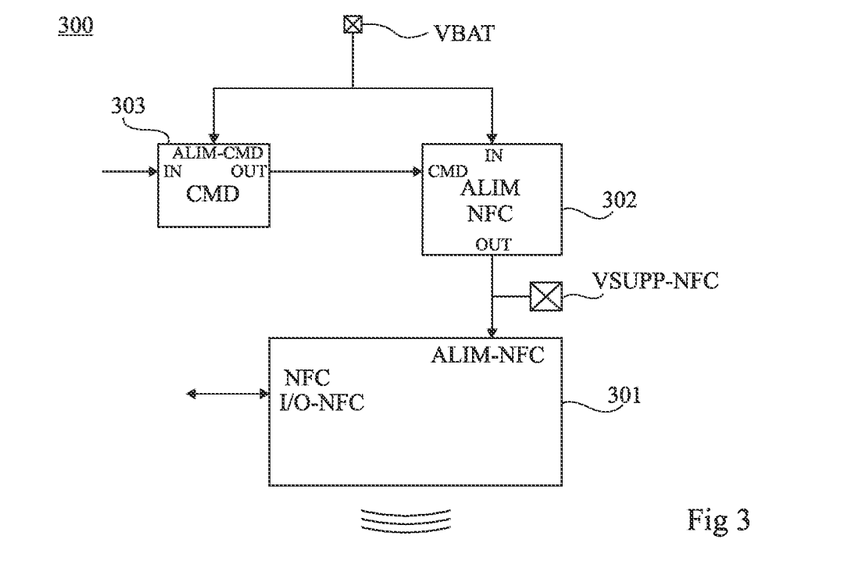
FIG. 3 very schematically shows in the form of blocks an embodiment of a portion of an embodiment of an electronic device.

FIG. 3 very schematically shows in the form of blocks a portion 300 of a device of the type of the device 100 described in relation with FIG. 1 or of the type of the device 200 described in relation with FIG. 2.

Portion 300 comprises: a near-field communication module 301 (NFC) or NFC module 301; a powering circuit 302 (ALIM NFC) associated with NFC module 301; and a control circuit 303 (CMD).

NFC module 301 is of the type of the NFC module 105 described in relation with FIG. 1 or of the NFC module 250 described in relation with FIG. 2. NFC module 301 is configured to emit and receive an electric field to implement a near-field communication. The NFC module comprises at least one power supply terminal ALIM-NFC and one internal communication terminal I/O-NFC. Power supply terminal ALIM-NFC is coupled, preferably connected, to powering circuit 302. Internal communication terminal I/O-NFC enables the NFC module to exchange data and instructions with the rest of the electronic device such as, for example, a signal of alert or information of the detection of a field capable of leading to a NFC communication. As previously described, NFC module 301 comprises a plurality of different power supply modes, for example, at least one "full power" power supply mode and at least a "low power" power supply mode. During the "low power" mode, NFC module 301 decreases the frequency at which it attempts to detect an electromagnetic field.

Powering circuit 302 is a circuit configured for managing the power supply of NFC module 301. For this purpose, circuit 302 comprises, at least, one input terminal IN receiving a power supply voltage VBAT, an output terminal OUT delivering a power supply voltage VSUPP-NFC intended to power NFC module 301, and a control terminal CMD. Power supply voltage VBAT is delivered to circuit 302, for example, by an internal power source of the electronic device such as a battery, or by a circuit for converting a power source external to the device to which it is coupled. Control terminal CMD enables to turn on or to turn off powering circuit 302. A more detailed embodiment of powering circuit 302 is described in relation with FIG. 4.

Control circuit 303 is a circuit configured to control powering circuit 302, and more precisely to control powering circuit 302 when NFC module 301 is in a "low power" mode. Counter 303 comprises a power supply terminal ALIM-CMD receiving voltage VBAT, an input terminal IN receiving programming data, and an output terminal OUT. Input terminal IN receives data informing control circuit 303 of the power supply modes of NFC module 301 and, for example, of the device. According to an example, input terminal IN receives these data directly from NFC module 301. Output terminal OUT delivers a control voltage to the control terminal CMD of powering circuit 302. A more detailed embodiment of counter 303 is described in relation with FIG. 4.

The operation of portion 300 is the following.

During a "full power" mode of NFC module 301, powering circuit 302 is always started, enabled, and powers NFC module 301.

During a "low power" mode of NFC module 301 and, according to an embodiment, control circuit 303 periodically enables powering circuit 302 so that powering circuit 302 only consumes power at the times when NFC module 301 needs it. More precisely, NFC module 301 only periodically implements a field search during the "low power" mode, powering circuit 302 is periodically enabled by control circuit 301 to only power NFC module 301 at the time when it attempts to detect a field. If NFC module 301 detects a field, powering circuit 302 can remain enabled until NFC module 301 has ended the actions that it has to do, examples of actions to be done are described in relation with FIG. 4. If NFC module 301 detects no field, then powering circuit 302 is turned off.

An advantage of this embodiment is that it enables to limit the power consumption of the electronic device during the implementation of the "low NFC module power" mode.

Figure 4:
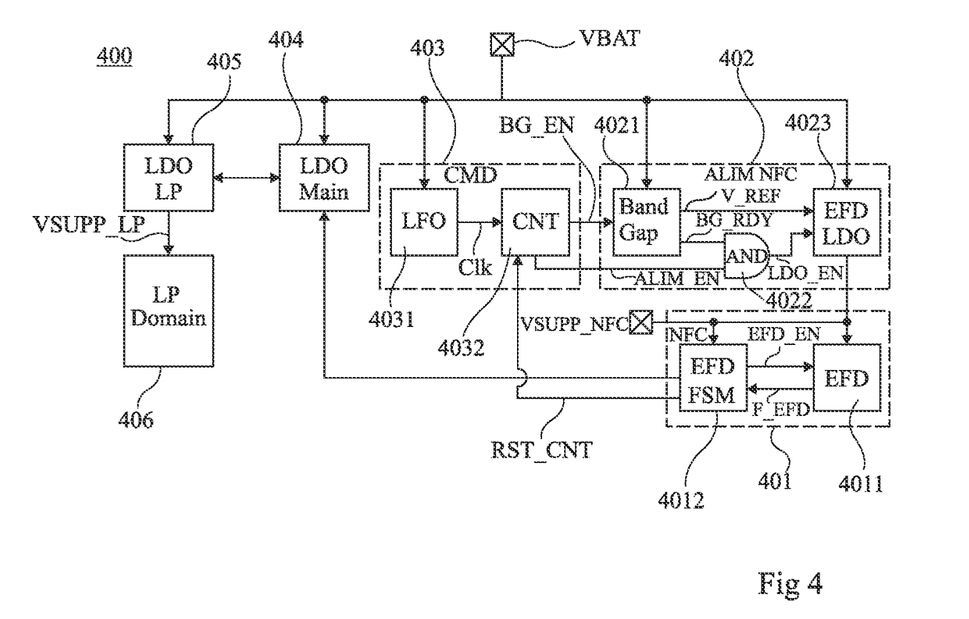
FIG. 4 shows in the form of blocks a more detailed embodiment of a portion of an embodiment of an electronic device.

FIG. 4 very schematically shows in the form of blocks a portion 400 of a device of the type of the portion 300 of the device described in relation with FIG. 3. Portion 400 is a practical example more detailed than the previously-described portion 300. The operation of portion 400 during a "low power" mode of the NFC module is described in relation with the timing diagrams of FIG. 5.

Portion 400 comprises: a near-field communication mode 401 (NFC), or NFC module 401, shown in dotted lines in FIG. 4; a powering circuit 402 (ALIM NFC) associated with NFC module 401, shown in dotted lines in FIG. 4; a control circuit 403 (CMD), shown in dotted lines in FIG. 4; a main voltage regulator 404 (LDO Main); a secondary voltage regulator 405 (LDO LP); and an assembly of "low power" circuits 406 (LP Domain).

NFC module 401 is partially shown in FIG. 4, and comprises at least one field detector 4011 (EFD) and a state machine 4012 (EFD FSM). Field detector 4011 and state machine 4012 are both powered with a voltage VSUPP_NFC delivered by powering circuit 402.

Field detector 4011 is a circuit configured to detect a field and to, in particular, find the frequency of a field that it detected. Field detector 4011 has other functionalities usual for those skilled in the art and which are not described herein. Field detector 4011 comprises a power supply terminal receiving voltage VSUPP_NFC, an enable terminal receiving an enable signal EFD_EN, and a frequency output terminal delivering a signal F_EFD representative of the frequency of a field detected by field detector 4011. For example, signal F_EFD is a clock signal having a frequency equal to the frequency of the field detected by field detector 4011. In other words, field detector 4011 extracts the frequency of the field that it detects and delivers it in the form of a clock signal.

State machine 4012 is a circuit configured to: enable field detector 4011; verify whether field detector 4011 detects a field likely to convey a near-field communication; and inform the device that a near-field communication is detected.

For this purpose, state machine 4012 comprises: a power supply terminal receiving voltage VSUPP_NFC; a terminal supplying enable signal EFD_EN to field detector 4011; a terminal receiving signal F_EFD; a terminal supplying an alert signal FSM_INFO, or information signal FSM_INFO to the device; and a terminal supplying a signal CNT_RST for resetting a counter to control circuit 403.

The powering circuit 402 (ALIM NFC) associated with NFC module 401 comprises at least: a circuit of reference voltage delivered by a band gap circuit 4021, or reference voltage circuit 4021; a logic "AND"-type gate 4022; and a secondary voltage regulator 4023 (EFD LDO).

Reference voltage circuit 4021 is powered with an internal power supply voltage VBAT, delivers a reference voltage V-REF, and is thus configured to deliver a state signal BG_RDY. Reference voltage circuit 4021 further receives an enable signal BG_EN. Power supply voltage VBAT is delivered to circuit 402, for example, by an internal power source of the electronic device such as a battery, or by a circuit for converting a power source external to the device to which it is coupled.

Logic gate 4022 is an "AND"-type gate comprising two inputs, a first input receiving the state signal BG_RDY from reference voltage circuit 4021, and a second input receiving an enable signal ALIM_EN from control circuit 403. Logic gate 4022 outputs a signal LDO_EN for enabling voltage regulator 4023.

Voltage regulator 4023 is a voltage regulator enabling, when it is enabled, to deliver power supply voltage VSUPP_NFC to NFC module 401 from voltage VBAT. For this purpose, voltage regulator 4023 receives voltage VBAT, reference voltage V_REF, and enable signal LDO_EN to output power supply voltage VSUPP_NFC.

The control circuit 403 (CMD) associated with powering circuit 402 comprises, for example, a low-frequency oscillator 4031 (LFO) and a counter 4032 (CNT). When NFC module 401 is in a "full power" mode, control circuit 403 is configured to permanently enable powering circuit 402. When NFC module 401 is in a "low power" mode, control circuit 403 is configured to periodically enable powering circuit 402.

Low-frequency oscillator 4031 is an oscillator supplying a clock signal Clk at constant frequency. According to an example, the clock signal has a frequency in the range from 60 to 70 kHz, for example, in the order of 64 kHz. For this purpose, low-frequency oscillator 4031 is powered with power supply voltage VBAT.

Counter 4032 is a circuit configured to periodically start powering circuit 402. For this purpose, counter 4032 receives clock signal Clk, reset signal RST_CNT, and outputs enable signal BG_EN and enable signal ALIM_EN. The value of counter 4032 is, for example, incremented at each new rising or falling edge of clock signal Clk. The more detailed operation of counter 4032, and more generally of control circuit 403, is described in further detail in relation with FIG. 5.

Main voltage regulator 404 (LDO Main) is a voltage regulator configured to deliver a power supply voltage forming the main power supply of the device. According to an example, regulator 404 delivers a power supply voltage enabling to power the main processor of the device, and an information signal LDO_INFO to secondary voltage regulator 405. The regulator receives voltage VBAT and information voltage FSM_INFO.

Secondary voltage regulator 405 (LDO LP) is a voltage regulator configured to deliver a power supply voltage forming a secondary power supply of the device. According to the example of FIG. 4, regulator 405 delivers a power supply voltage enabling to power all the "low power" circuits of the device with a voltage VSUPP-LP. Regulator 405 receives voltage VBAT and information signal LDO_INFO. Information signal LDO_INFO may, for example, enable regulator 404 to indicate its operating state to regulator 405.

The assembly of "low power" circuits 406 (LP Domain) is the assembly of the circuits and components of the device which are powered when the device is in a "low power" mode. According to an example, when the device is in a "full power" mode, regulators 404 and 405 are both enabled, but when the device is in a "low power" mode, regulator 404 is disabled and regulator 405 is enabled.

According to an alternative embodiment, reference voltage circuit 4021 may form part of control circuit 403 rather than of powering circuit 402.

Figure 5A:
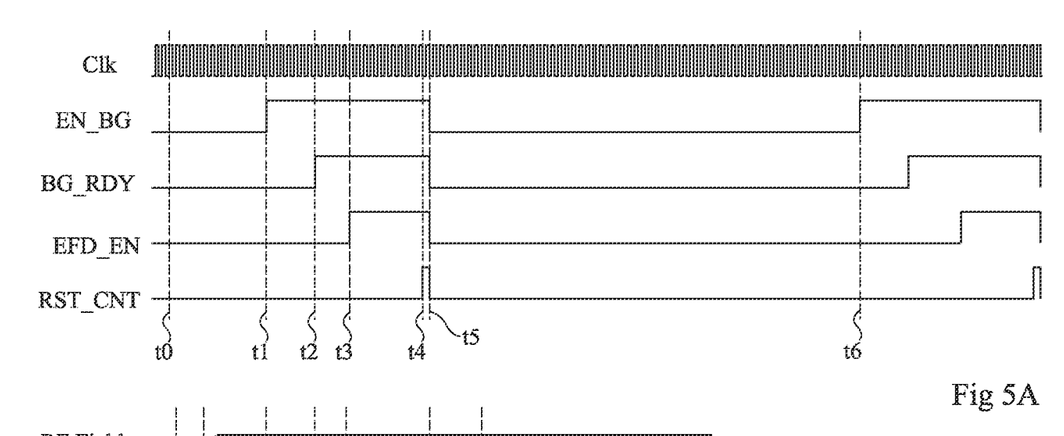
FIGS. 5A-5B show timing diagrams illustrating the operation of the embodiment of FIG. 4.
Figure 5B:
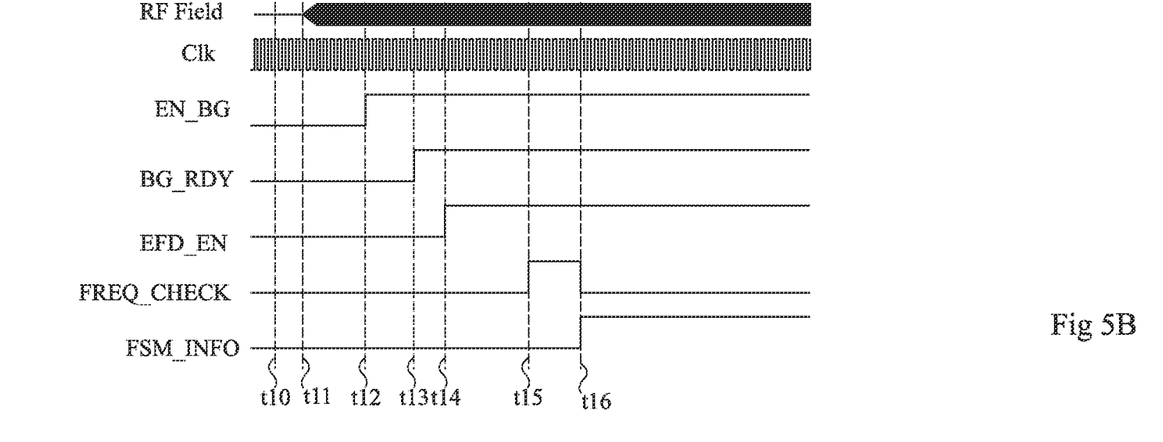

FIGS. 5A-5B show timing diagrams illustrating the operation of the portion 400 of the device described in relation with FIG. 4 when NFC module 401 is in a "low power" mode. FIG. 5A illustrates the operation of portion 400 when NFC module 401 is in a "low power" mode and no field is detected by field detector 4011. FIG. 5B illustrates the operation of portion 400 when NFC module 401 is in a "low power" mode and a field is detected by field detector 4011.

FIG. 5A comprises the timing diagrams of the following signals: clock signal Clk; signal EN_BG for enabling reference voltage circuit 4021; the state signal BG_RDY of reference voltage circuit 4021; signal EFD_EN for enabling field detector 4011; and signal RST_EN for resetting counter 4032.

At an initial time t0, all the signals of FIG. 5A are in a low state, for example, a voltage level equal to a reference voltage, for example, voltage V_REF or another voltage. Clock signal Clk has regular rising and falling edges.

At a time t1, subsequent to time t0, enable signal EN_BG switches from the low state to a high state, for example a voltage level higher than the reference voltage level. In other words, counter 4032 launches the starting of reference voltage circuit 4021. According to an example, counter 4032 launches the starting of the reference voltage circuit because its value has reached a threshold value. In parallel, counter 4032 indicates to powering circuit 402 that it requests its starting, for example via enable signal ALIM_EN which also transitions from a low state to a high state.

At a time t2, subsequent to time t1, state signal BG_RDY transitions from the low state to the high state. Reference voltage circuit 4021 thus indicates that its starting phase is over and that it is ready to be used.

By transitioning to a high state, signal BG_RDY allows the starting of voltage regulator 4023 via enable signal LDO_EN.

At a time t3, subsequent to time t2, signal EFD_EN for enabling field detector 4011 transitions from a low state to the high state, and then makes field detector 4011 active. Field detector 4011 actively searches for a field.

At a time t4, subsequent to time t3, the value of counter 4011 reaches a limiting value, greater than the threshold value, and its reset signal exhibits a pulse. The value of counter 4011 is then set to zero.

If the value of counter 4011 has reached a limiting value, this means that during the time period when it was active, that is, between times t3 and t4, field detector 4011 has detected no field likely to lead to an NFC communication.

At a time t5, subsequent to time t4, signals EN_BG, BG_RDY, and EFD_EN transition to the low state, as a result of the peak present on signal RST_CNT. The reference voltage circuit, voltage regulator 4023, and NFC module 402 are no longer powered and/or enabled.

At a time t6, subsequent to time t5, a new phase of starting of the field detector starts, and like at time t1, signal EN_BG transitions from the low state to the high state.

The advantage of this embodiment is that when the field detector is not enabled, powering circuit 402 consumes no power since it is itself not enabled.

FIG. 5B comprises the timing diagrams of the following signals: the state of a field RF Field detectable by field detector 4011 and likely to lead to a NFC communication; clock signal Clk; signal EN_BG for enabling reference voltage circuit 4021; the state signal BG_RDY of reference voltage circuit 4021; signal EFD_EN for enabling field detector 4011; an internal signal FREQ_CHECK of state machine 4012; and the information signal FSM_INFO of state machine 4012.

At an initial time t10, all the signals of FIG. 5B are in a low state, for example, a voltage level equal to a reference voltage, for example, voltage V_REF or another voltage. Clock signal Clk has regular rising and falling edges. Further, no field RF Field is detectable by field detector 4011.

At a time t11, subsequent to time t10, the field RF Field likely to lead to a near-field communication is close to the device, and can be detected by field detector 4011.

At a time t12, subsequent to time t11, and like at the previously-described time t1, enable signal EN_BG transitions from the low state to the high state. In other words, counter 4032 launches the starting of reference voltage circuit 4021. In parallel, counter 4032 indicates to powering circuit 402 that it requests its starting, for example via enable signal ALIM_EN, which also switches from a low state to a high state.

At a time t13, subsequent to time t12, state signal BG_RDY transitions from the low state to the high state. Reference voltage circuit 4021 thus indicates that its starting phase is over and that it is ready to be used.

By switching to a high state, signal BG_RDY allows the starting of voltage regulator 4023 via enable signal LDO_EN.

At a time t14, subsequent to time t13, the signal EFD_EN for enabling field detector 4011 transitions from a low state to the high state and then makes field detector 4011 active. Field detector 4011 actively searches for a field.

Since field RF Field is likely to be detected by field detector 4011, the latter detects it, and determines the frequency of field RF Field. As previously described, and for this purpose, field detector 4011 extracts the frequency of field RF Field and delivers clock signal F_EFD having a frequency equal to the frequency of field RF Field. Then, the frequency is estimated, by state machine 4012, by comparing the frequency of signal F_EFD with a reference clock signal, for example, signal Clk. The reference clock signal for example has a frequency in the order of 64 kHz.

To perform this comparison, state machine 4012 may, for example, count the number of periods of signal F_EFD during a period of the reference clock signal. According to an example, if the reference clock signal is clock signal Clk and it has a frequency in the order of 64 kHz, then the state machine verifies that signal F_EFD has between 192 and 235 periods during a period of signal Clk. Thereby, the state machine verifies whether the field frequency is sufficiently close to the reference frequency, generally 13.56 MHz, with an error margin in the order of 10%.

At a time t15, subsequent to time t14, the internal signal FREQ_CHECK of state machine 4012 transitions from the low state to the high state and thus indicates that the frequency received, via signal F_EFD, from field detector 4011 is sufficiently close to the reference frequency, that is, in the order of the reference frequency with an error margin in the order of 10%. In other words, the state machine confirms the fact that field RF Field is likely to lead to a near-field communication.

At a time t16, subsequent to time t15, information signal FSM_INFO transitions from a low state to a high state. According to an example, information signal FSM_INFO may enable to start a main powering circuit, such as regulator 404, of the device. Information signal FSM_INFO may, according to another example, thus indicate that the device should be ready for a NFC communication and that it should switch to an adapted power consumption mode, such as a "full power" or "low power" mode if the device is in a "hibernate" mode.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

The invention claimed is:

1. An electronic device, comprising:
a powering circuit configured to provide a supply voltage; and
a near-field communication module having a power supply input coupled to receive said supply voltage from the powering circuit and a field detector;
wherein said near-field communication module is configurable for operation in a full power mode where said field detector operates to detect presence of a field for near-field communication with a detection rate at or higher than a first frequency and in a low power mode where said field detector operates to detect presence of said field for near-field communication with a detection rate at a second frequency less than the first frequency; and
wherein when in said low power mode, said powering circuit is configured to periodically provide the supply voltage to said near-field communication module only at times when the field detector attempts to detect presence of said field for near-field communication.

2. The device according to claim 1, further comprising a control circuit coupled to the powering circuit, and wherein, when said near-field communication module is in the low power mode, said control circuit is configured to periodically start said powering circuit.

3. The device according to claim 2, wherein the control circuit comprises a counter.

4. The device according to claim 3, wherein, when said near-field communication module enters the low power mode, the counter is started, and wherein the powering circuit is started by the control circuit when a value of the counter reaches a threshold value.

5. The device according to claim 4, wherein, when said near-field communication module is in the low power mode and when the value of the counter reaches a limiting value that is greater than the threshold value, the powering circuit is stopped by the control circuit and the value of the counter is reset.

6. The device according to claim 2, wherein said control circuit further comprises a reference voltage generating circuit.

7. The device according to claim 6, wherein the reference voltage generating circuit is a band gap circuit.

8. The device according to claim 1, wherein, when said near-field communication module is in the low power mode and wherein when the powering circuit is started by the control circuit, the field detector of said near-field communication module is started.

9. The device according to claim 1, wherein said near-field communication module further comprises a comparison circuit configured to compare a frequency of an electric field detected by said field detector with a reference frequency.

10. The device according to claim 9, wherein said comparison circuit is a state machine.

11. The device according to claim 9, wherein, when said near-field communication module is in the low power mode and when said comparison circuit determines that the frequency of the field detected by said field detector is substantially equal to the reference frequency, an alert signal is generated.

12. The device according to claim 11, wherein substantially equal is satisfied if within an error margin in the order of 10%.

13. The device according to claim 11, further comprising a circuit for powering a processor configured to receive said alert signal.

14. The device according to claim 13, wherein said circuit for powering comprises a voltage regulator configured to regulate an internal power supply voltage and deliver said supply voltage to said near-field communication module.

15. The device according to claim 1, wherein said powering circuit comprises a reference voltage generating circuit.

16. The device according to claim 15, wherein the reference voltage generating circuit is a band gap circuit.

* * * * *